VESTIGIAL SIDEBAND TRANSMISSION SYSTEM

Filed Dec. 18, 1962 2 Sheets-Sheet 1

INVENTORS
DALE L. CRITCHLOW
ROBERT H. DENNARD

BY John J. Goodwin

ATTORNEY

United States Patent Office 3,229,209

Patented Jan. 11, 1966

3,229,209

VESTIGIAL SIDEBAND TRANSMISSION SYSTEM

Dale L. Critchlow, Lincolndale, and Robert H. Dennard, Croton-on-Hudson, N.Y., assignors to International Business Machines Corporation, New York, N.Y., a corporation of New York Filed Dec. 18, 1962, Ser. No. 245,590
5 Claims. (Cl. 325—136)

The present invention relates to data transmission and reception systems and more particularly to carrier retrival circuits for synchronous detection in vestigial sideband suppressed carrier modulation transmission.

A data transmission mode that is very favorable in terms of error rate for a given signal-to-noise ratio is the binary, double sideband suppressed carrier modulation system with synchronous detection at the receiver. The double sideband system using binary coding however, requires a relatively large bandwidth. An acceptable method of decreasing the bandwidth requirement is to eliminate one of the two sidebands since each sideband carries all the information. In practice, a small portion or vestige of the suppressed sideband is left in the signal in order to render the circuitry physically realizable, from which the term "vestigial sideband transmission" is derived which will be hereinafter referred to as VSB transmission is distinct from single sideband transmission (SSB) in that one complete sideband and a small portion of the other sideband are suppressed in SSB resulting in a bandpass baseband channel.

The use of VSB transmission in combination with synchronous detection at the receiver is known to be advantageous in that suppressed carrier transmission can be used and quadrature distortion, present when envelope detection is used, is eliminated. Synchronous detection, however, requires a method of retrieval of the carrier wave with the proper frequency and phase at the receiver, and heretofore no satisfactory system has been known for retrieving this carrier wave at the receiver for use in synchronous detection in a VSB suppressed carrier modulation system for random binary data with no code restrictions.

Accordingly, one object of the present invention is to provide an improved VSB transmission system employing synchronous detection.

Another object of the present invention is to provide a VSB transmission system wherein the presence of a pair of component frequencies (including a carrier frequency component) are included in the transmitted signal.

Another object of the present invention is to provide a VSB transmission system wherein a pair of component frequencies are introduced into the transmitted signal by the injection of a D.C. signal of proper magnitude into the data signal.

Still another object of the present invention is to provide a VSB transmission system wherein a pair of component frequencies are introduced into the transmitted signal by modulating the data signal with a digital signal.

A further object of the present invention is to provide a VSB transmission system wherein a pair of component frequencies are included in the transmitted signal by a bias distortion of the data signal.

A further object of the present invention is to provide a VSB transmission system wherein a pair of frequency components added at the transmitter are utilized for retrieving the carrier at the receiver.

The foregoing and other objects, features and advantages of the invention will be apparent from the following more particular description of preferred embodiments of the invention, as illustrated in the accompanying drawings.

Figure 1:
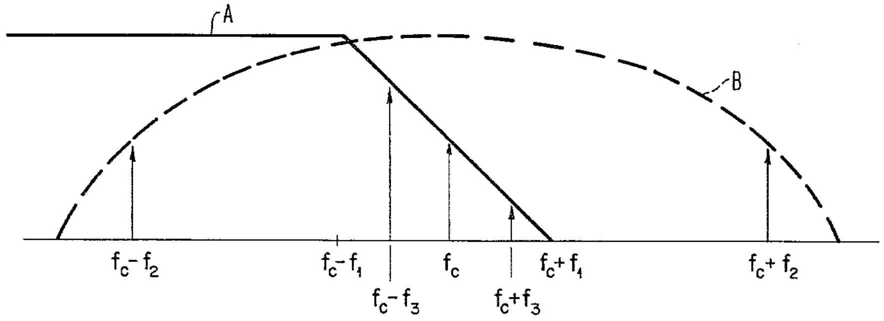
FIG. 1 is an illustration of an idealized frequency characteristic of a typical VSB filter.

Referring to FIG. 1, an illustration of an idealized characteristic of a typical VSB filter is shown and is designated by reference character A. The frequency spectrum of the modulator output for a random data signal (hereinafter referred to as the modulation signal) is indicated by reference character B and is seen to include a lower and an upper sideband symmetrical about a carrier frequency $f_c$. It is graphically seen that when the modulation signal represented by B is passed through the VSB filter, there will be uniform transmission for all modulation signal frequency components in the lower sideband which are removed from the carrier by an amount greater than $f_1$ and there will be essentially zero transmission for all modulation signal frequency components in the upper sideband removed from the carrier by an amount greater than $f_1$, where $f_c+f_1$ is the highest frequency for which the VSB filter has a significant output and $f_1$ is the baseband equivalent of carrier recovery bandwidth. In the frequency range extending from $f_c-f_1$ to $f_c+f_1$ the modulation signal is attenuated according to the slope of the roll-off characteristic of the VSB filter which, in the ideal case, is linear.

The frequencies $f_c-f_2$ and $f_c+f_2$ represent the components of a modulation signal in the upper and lower sidebands corresponding to a data signal having a single frequency $f_2$ (for example a repetitive 1010 . . . binary signal). It is seen that in VSB transmission, the component of the modulation signal in the upper sideband will not be transmitted to the receiver. When the VSB signal is sent through a transmission channel having frequency translation (such as a telephone line), a single frequency component, other than the carrier frequency, is not sufficient to determine the carrier frequency needed for synchronous demodulation at the receiver. Thus synchronous demodulation of the transmitted signal is not readily feasible.

It is true that low frequency components (including D.C.) are present in some data patterns which produce modulation terms in the frequency range $f_c-f_1$ to $f_c+f_1$ and permit the carrier to be retrieved. However, some other repetitive data patterns do not include a D.C. component or a frequency component lower than $f_1$. It would be possible to employ only those data patterns which contain a low frequency component or a D.C. component and avoid using the data patterns which do not. Such code restrictions unduly limit the transmission system as a whole, particularly since repetitive patterns (i.e. those tending not to have low frequency components) are very common. Attempts have been made to overcome this problem and to retrieve the carrier for synchronous demodulation of VSB transmission in the absence of either a carrier term or a pair of components of the modulation signal in the transmitted signal. For example, one known method is to inject first and second pilot signals at frequencies within the transmission passband. The pilot signals undergo the same frequency changes and distortions as the carrier and therefore may be employed to retrieve the carrier for synchronous demodulation. The objections to this method is the complexity and that it increases the bandwidth and the power level of the transmitted signal and thereby reduces the advantage gained by using VSB transmission.

In the present invention additional circuitry is added to the VSB transmitter to provide a pair of component frequencies symmetrical about the carrier frequency in the transmitted signal, or the special case thereof which is a component at carrier frequency. The pair of component frequencies or the carrier component will then be employed for carrier retrieval at the receiver. In the embodiments to be described, the presence of a pair of component frequencies or a carrier component in the transmitted signal is guaranteed by the provision of circuits which introduce low frequency components in the data signal, and which insures that the low frequency components so provided will not cancel the low frequency components which may already be present in some repetitive data patterns. In the following discussion, the term "low frequency component" relates to either a signal which, when introduced into the transmitter modulator, will produce a pair of component frequencies in the transmitted signal which are symmetrical about the carrier frequency in the range $f_c-f_1$ to $f_c+f_1$, or a D.C. component which, when introduced into the transmitter modulator, will produce a component at carrier frequency in the transmitted signal.

Both the pair of component frequencies in the range $f_c-f_1$ to $f_c+f_1$ and the component at carrier frequency will hereinafter be referred to as "a pair of component frequencies" because the component at carrier frequency is actually the special case where the pair of component frequencies are separated by zero distance and appear at the carrier frequency. Thus, the introduction of low frequency components into the data signal produce pairs of components in the transmitted signal symmetrical about the carrier frequency and in the range $f_c-f_1$ to $f_c+f_1$. As the frequency of the low frequency components decreases, the distance between the pairs of components decreases until the low frequency components become D.C. and the pairs of the component frequencies combine at the carrier frequency to produce a carrier component.

Figure 2:
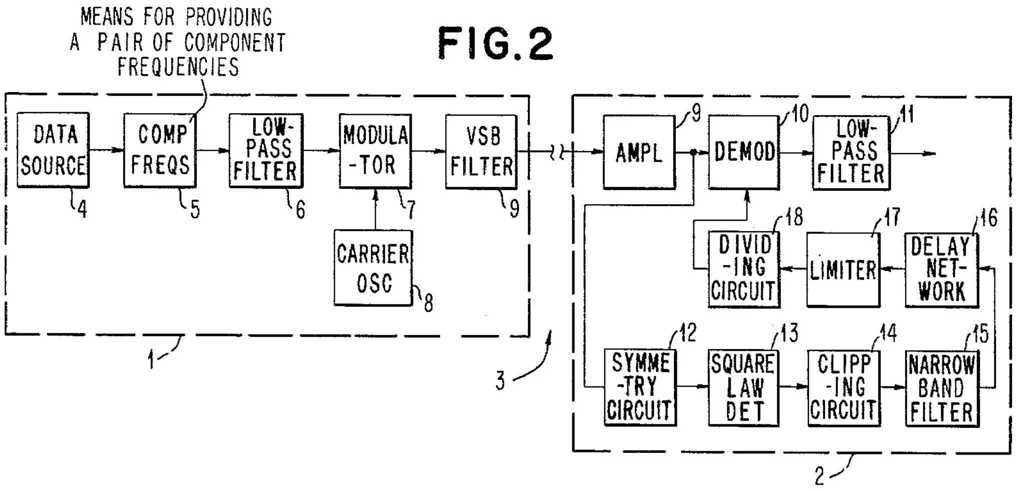
FIG. 2 is a schematic diagram of a VSB transmission system following the principles of the present invention

Referring to FIG. 2, a VSB transmission system is shown including a transmitter 1 and a receiver 2 electrically connected by a suitable transmission medium 3 shown, for purposes of example, as a transmission line. Transmitter 1 includes a source of data signal 4, a low-pass filter 6, a balanced modulator 7 which modulates a carrier signal from oscillator 8 with the data signal, and a VSB filter 9. Balanced modulator 7 produces an output which is proportional to the product of the data signal and the carrier signal and is often referred to in the art as a product modulator. According to the principles of the present invention, additional circuitry referred to as "means for providing a pair of component frequencies in the transmitted signal" is included as represented by reference numeral 5.

Circuit 5 modifies the data signal from source 4 to provide low frequency components in the data signal which will produce a pair of component frequencies in the transmitted signal in the range $f_c-f_1$ to $f_c+f_1$ such that the carrier may be retrieved from the transmitted signal at the receiver by circuitry to be later described.

Circuit 5 is not restricted to one particular circuit arrangement for providing such pair of component frequencies in the transmitted signal but rather generically represents a variety of circuitry for accomplishing the same result.

Figure 3:
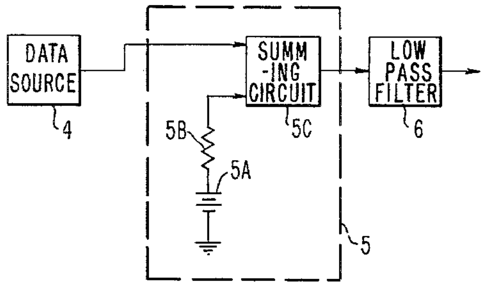
FIG. 3 is a schematic diagram of an embodiment of a circuit in the system of FIG. 2.

One example of a method to guarantee the presence of a pair of component frequencies in the transmitted signal via the introduction of a low frequency component in the data signal is by the injection of a D.C. component into the data signal from source 4. More specifically, the injection of the D.C. (i.e. low frequency) component produces a component at carrier frequency in the transmitted signal. In this method, circuit 5 would consist of a D.C. supply, such as battery 5A in series with resistor 5B, which adds a D.C. component to the data signal from source 4 at summing circuit 5C as shown in FIG. 3. The D.C. signal thus added to the data signal, when introduced into modulator 7, will result in a component at carrier frequency $f_c$ in the modulation signal from modulator 7 which, when transmitted to receiver 2, can be used for synchronous demodulation. It is necessary to insure that the level of the D.C. signal injected by the battery 5A is such that it will not cancel out D.C. components which may be present in some repetitive data patterns as previously mentioned.

Consider that the data signal from data source 4 is the bipolar binary type of coded signal which varies between $\pm 1$ unit. An analysis can be made of the binary signals possible for repetitive data patterns of any length to determine the possible D.C. components. If such data signal has produced a pair of frequency components in the range $f_c-f_1$ to $f_c+f_1$ independent of the average D.C. component of the signal, it is immaterial if the injected D.C. signal and the D.C. component of the data signal cancel since the pair of frequency components will provide the necessary carrier retrieval information in the transmitted signal. Thus it is only necessary to consider data signals having a fundamental frequency component greater than $f_1$. For convenience, the following designations will be employed:

$f_0$=fundamental frequency of the data signal
$f_d$=the data rate of the data signal
$n$=the pattern length in bits of the data pattern which repeats It is known that $$f_0=\frac{f_d}{n}$$

and since only data patterns wherein $f_0>f_1$ are being considered, then:

$$\frac{f_d}{n}>f_1$$

or $$n<\frac{f_d}{f_1}$$

In every system the maximum data rate $f_d$ wil be known and $f_1$ will also be known. Therefore the maximum pattern length $n$ of the data patterns which will not have pairs of components in the range $f_c-f_1$ to $f_c+f_1$ can be determined and such data patterns can be analyzed to determine the D.C. levels which may be present. The level of the D.C. signal injected can then be selected such that cancellation will not occur.

To illustrate, consider a system wherein the values of $f_d$ and $f_1$ are such to produce a ratio of $fd/f_1$ equal to 5. Thus the data patterns which must be analyzed have pattern lengths ($n$) of 5 bits or less. The D.C. levels of pattern lengths of 5 bits or less can readily be calculated. For example, for the bipolar binary code which varies between $\pm 1$ unit a data pattern of length one will be at either $+1$ unit or $-1$ unit for a $\pm 1$ unit average, a code pattern of length two will consist of a $+1$ unit and a $-1$ unit for a zero D.C. average. Note, a pattern consisting of all $+1$ units or all $-1$ units will not be considered since it is the same as a series of patterns of length one and will have a D.C. level of either $+1$ or $-1$ unit. A code pattern of length three will consist of either two $+1$ units and one $-1$, or two $-1$ units and one $+1$ unit providing a D.C. average of ±.33 of a unit. A code pattern of length four will consist of either two +1 units and two −1 units for a D.C. average of zero, or ± three units and ∓ one unit for a D.C. average of ±.50 of a unit. A code pattern of five units will consist of either ± three units and ∓ two units for a D.C. average of ±.20 of a unit, or ± four units and ∓ one unit for a D.C. average of ±.60 of a unit. Thus, for the system wherein the ratio $f_d/f_1$ equals 5, the minimum D.C. level of data signals not producing pairs of components in the transmitted signal in the range $f_c-f_1$ to $f_c+f_1$ is ±.20 unit. The amount of D.C. signal injected by battery 5A must be of a magnitude that it will not be cancelled by the aforesaid data signals, therefore, a D.C. signal one-half the magnitude of the minimum D.C. possible in the aforesaid data signal is selected. In the present example the D.C. signal injected by battery 5A would be ±0.1 unit. Thus data patterns previously having a D.C. level of zero will now contain a D.C. component of ±0.1 unit and all other data patterns will have at least a D.C. component of ±0.1 unit. In the general case, the ratio $f_d/f_1$ is determined, the D.C. levels for data patterns having $n$ less than $f_d/f_1$ is calculated, and the D.C. level for the injected signal is selected so as not to cancel with the data signal.

Figure 4:
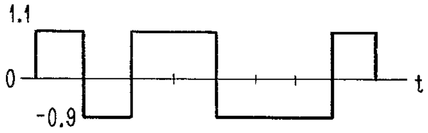
FIG. 4 is an illustration of a waveform useful in describing the operation of the circuit of FIG. 3.

Referring to FIG. 4, the waveform of a typical bipolar binary data signal which originally varied between plus and minus 1 unit (of voltage) is shown after being modified by the addition of 0.1 unit of D.C. voltage from battery 5. The data signal will now vary between plus 1.1 units and minus 0.9 unit insuring at least a 0.1 unit D.C. component which, when introduced into modulator 7, will result in a component at carrier frequency in the transmitted signal.

The limitation that the magnitude of the D.C. voltage injected by battery 5A be selected such that no cancellation will occur is necessary when the data signal may include data patterns having a D.C. component. This limitation is not necessary when it is known that the data signal does not include a D.C. component. For example, when particular coding, such as the 4 of 8 code is being employed, it is known that there will be no D.C. component present and there need be no limitation on the magnitude of the D.C. component injected by battery 5A.

Figure 5:
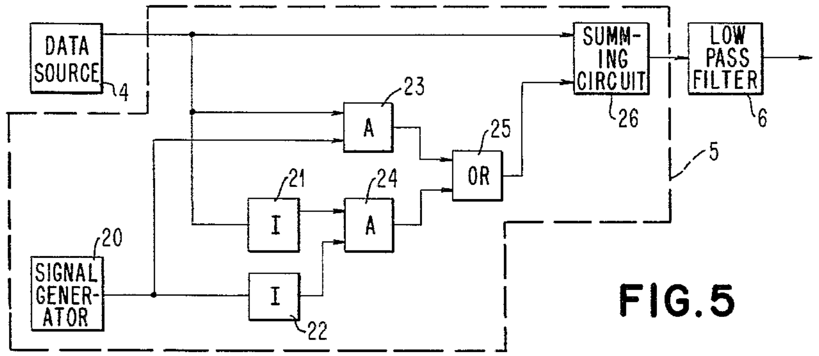
FIG. 5 is a schematic diagram of another embodiment of a circuit in the system of FIG. 2.
Figure 6:
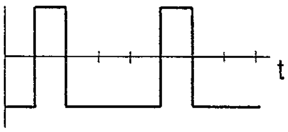
FIGS. 6 and 7 are illustrations of waveforms useful in describing the operation of the circuit of FIG. 5.

Another embodiment of circuit 5 for providing a pair of component frequencies in the transmitted signal by introducing a low frequency component into the data signal is shown in FIG. 5. The circuit of FIG. 5 provides means for modulating the data signal by a periodic signal having predetermined frequency components such that the modified data signal contains low frequency components less the $f_1$ which, when multiplied with the carrier signal, results in a pair of component frequencies in the transmitted signal in the range $f_c-f_1$ to $f_c+f_1$. More specifically, the circuit of FIG. 5 shows an embodiment including a signal generator 20 which produces a repetitive pattern, which may be for example a four-bit pattern output signal wherein three consecutive "1's" are followed by one "0" in the NRZ code which is suitable for the system having a $f_d/f_1$ ratio of 5. Signal generator 20 may be driven by the data clock of data source 4 so the output signals from signal generator 20 will be synchronous with the output signals from data source 4. The waveform of the output signal from generator 20 is shown in FIG. 6. In FIG. 5, the output signals from data source 4 and signal generator 20 are applied to a logic circuit including inverters 21 and 22, "AND" gates 23 and 24, and "OR" gate 25. If the negative level of the data patterns from data source 4 and signal generator 20 is considered as binary "0" and the positive level of the signals is considered as binary "1," then the logic circuit is designed to condition a positive state of the output of "OR" circuit 25 when the signals from data source 4 and signal generator 20 are both "1's" or "0's" concurrently, and a negative state at the output of "OR" circuit 25 when the signals from data source 4 and generator 20 are "1" and "0" or "0" and "1" concurrently. The positive and negative output signals from "OR" circuit 25 are added to the data signal from data source 4 at the summing circuit 26.

Figure 7:
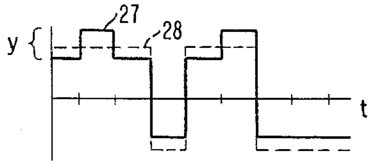

The effect of adding the positive and negative output signals of "OR" circuit 25 to a typical data signal from source 4 is graphically shown by reference number 27 in FIG. 7 with the original data signal shown by the dotted line 28. The voltage amplitude "y" indicated in FIG. 7 is the voltage difference between the positive and negative output signals of "OR" gate 25 (FIG. 5). The modified data signal as shown in FIG. 7 contains harmonics which, when multiplied by the carrier in modulator 7, result in a pair of frequency components in the modulation signal which are symmetrical about the carrier frequency at a distance less than $f_1$ as illustrated by frequencies $f_c-f_3$ and $f_c+f_3$ in FIG. 1. The frequencies $f_c-f_3$ and $f_c+f_3$ will be passed by VSB filter 9 and will remain in the VSB transmitted signal as component frequencies which may be utilized to retrieve the carrier at the receiver.

Figure 8:
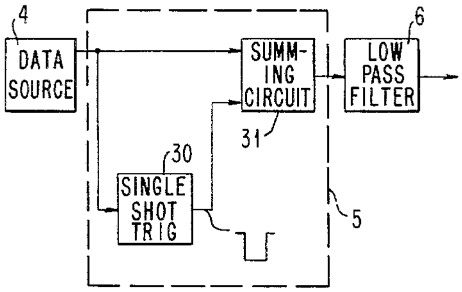
FIG. 8 is a schematic diagram of a further embodiment of a circuit in the system of FIG. 2.
Figure 9:
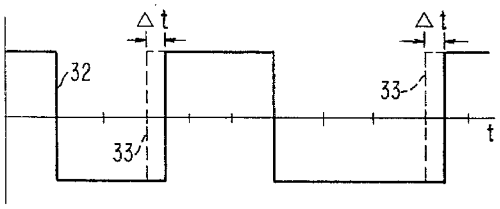
FIG. 9 is an illustration of a waveform useful in describing the operation of the circuit of FIG. 8.

Another embodiment of circuit 5 of FIG. 1 is shown in FIG. 8. In this embodiment, low frequency components (i.e. a D.C. level) is introduced into the data signal by a bias distortion. In FIG. 8, circuit 5 includes a single-shot trigger circuit 30 and a summing circuit 31. The single-shot trigger circuit 30, connected to the output of data source 4, produces a negative output pulse in response to the positive-going variations of the data signal. The negative pulse outputs from trigger circuit 30 are equal in amplitude to the negative to positive amplitude swing of the data signal. The output pulses from trigger circuit 30 are added to the data signal from data source 4 at summing circuit 31. The result of the summation is graphically shown in FIG. 9. In FIG. 9, the waveform represented by the solid line 32 is the output signal from summing circuit 31 (FIG. 8). The dotted lines 33 represent the position in time of the positive going variations of the data signal from data source 4. The time delay $\Delta t$ between the positive going variation of the original data signal and the positive going variation of the output signal from summing circuit 31 is due to the addition of the negative pulse from trigger 30. For data patterns having no D.C. components the time delays $\Delta t$ occurring at the positive transitions of the data signal result in a widening of the negative bit period preceding the transition and a narrowing of the positive bit period following the transition resulting in a D.C. component in the data pattern. The presence of the D.C. compoent provides a component at carrier frequency in the modulation signal as previously discussed. The width of the negative pulse from trigger circuit 30 can be adjusted in accordance with the number of transitions per bit that the data signal undergoes to provide an amount of D.C. components in the data signal which will not cancel the D.C. components present in those patterns which contain D.C. components but no frequency components less than $f_1$. The net D.C. component introduced is proportional to the number of transitions per bit that the data signal undergoes, and also to the width of the negative pulse from trigger circuit 30.

Still another way of insuring a pair of frequency components (i.e. a carrier component) in the transmitted signal by the addition of a low frequency component (D.C.) in the data signal is by the addition of extra bits to the data signal to maximize the magnitude of the D.C. level. To illustrate, any seven bit character, for example 1001101, would have a minimum D.C. magnitude of 1/7 units. By the addition of a positive bit the D.C. level is raised to a minimum magnitude of 1/4. Likewise a five bit character such as 01001 would have a minimum D.C. magnitude of 1/5. The addition of a negative bit increases the minimum D.C. level to 1/3.

The foregoing discussion illustrated various embodiments of circuit 5 (FIG. 2) which may be utilized to provide a pair of frequency components symmetrical about the carrier frequency within the range $f_c-f_1$ to $f_c+f_1$ by providing a low frequency component (including D.C.) in the data signal. It is obvious that other circuitry may be provided for circuit 5 for accomplishing this desired result, and circuit 5 is intended to broadly represent any means for providing a pair of frequency components as described (which includes a component at the carrier frequency) in the transmitted signal.

In the embodiments shown, the circuitry for providing such component pairs in the transmitted signal operated in conjunction with the data signal from data source 4. It is to be understood that the provision of the component pairs in the transmitted signal is not limited to the modification of the data signal, but may be carried out by the modification of signals at other portions of the transmitter, for example, the introduction of a predetermined amount of carrier signal to the modulation signal output from modulator 7.

Having indicated how a pair of component frequencies symmetrical about the carrier frequency may be included in the transmitted signal in order that the carrier may be retrieved at the receiver for synchronous demodulation, the circuitry included in the receiver for retrieving the carrier will now be discussed.

Referring to FIG. 2, receiver 2 includes an amplifier 9, a balanced demodulator 10 and a low pass filter 11 coupled in series. Coupled to the output of amplifier 9 is a series arrangement including a symmetrizer circuit 12, a square law detector 13, clipping circuit 14, a narrow band filter 15, a delay network 16, a limiting circuit 17, and a divider circuit 18, the output of which is coupled to balanced demodulator 10.

Figure 10:
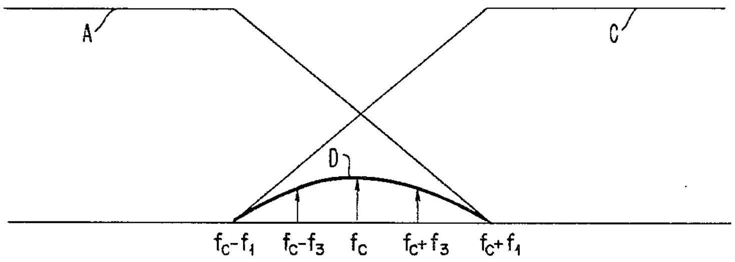
FIG. 10 is an illustration of a filter characteristic of a circuit associated with the system of FIG. 2.

The specific circuits included within the receiver 2 are conventional with the exception of symmetrizer circuit 12; for example, square law detector 13 may be a full wave rectifier, clipping circuit 14 may be a diode clipper, narrow band filter 15 may be a tuned circuit tuned to twice the carrier frequency, and delay network 16 may be a phase shift circuit and balanced demodulator 10 may be a product modulator similar to circuit 7 in the transmitter. The function of symmetry circuit 12 is to be responsive to the received VSB signal and to provide a double sideband signal consisting of the components within the range of $f_c-f_1$ to $f_c+f_1$, and wherein said components are symmetrical in amplitude and phase with respect to the carrier frequency. In practice symmetrizer circuit 12 may be, for example, a complementary filter having characteristics which are the complement of the characteristics of the VSB filter 9. The VSB filter, as seen in FIG. 1, is ideally a low pass filter having no significant output above $f_c+f_1$ and with a linear attenuation characteristic between $f_c-f_1$ and $f_c+f_1$. The complementary filter employed as symmetrizer circuit 12 would therefore be a high pass filter with no significant output below $f_c-f_1$ and a linear attenuation slope between $f_c-f_1$ and $f_c+f_1$. The characteristic of the complementary filter with respect to the characteristic of VSB filter 9 is shown in FIG. 10 with A representing the VSB filter characteristic and C representing the complementary filter characteristic.

From FIG. 10 it is seen that any VSB signal components below $f_c-f_1$ will be fully attenuated by the complementary filter. The combined overall characteristic of the VSB and complementary filters is illustrated by curve D. A pair of frequency components within the range $f_c-f_1$ to $f_c+f_1$ such as the components $f_c-f_3$ and $f_c+f_3$ shown in FIG. 1 are thus equal in amplitude as shown in FIG. 10. The output signal from the complementary filter is, therefore, a double sideband signal symmetrical about the carrier frequency. Thus, components of the VSB signal which are at carrier frequency or frequencies within the $f_c \pm f_1$ range are applied to full wave rectifier 13. The square law detector (i.e. full wave rectifier) 13 is employed because, in the present example, the carrier signal reverses in phase when the modulating signal changes in polarity. The square law detector 13 removes the phase reversals and produces an output signal having a component at $2f_c$. Clipping circuit 14 is included to reduce the range of amplitude variation of the $2f_c$ waveform by changing the harmonic content and reducing the amplitude which varies over a wide range as a function of the data pattern. The output signal from clipping circuit 14 is filtered by narrow band filter 15 which is tuned to $2f_c$. Delay network 16 is employed to establish the correct phase of the retrieval carrier relative to the input to demodulator 10. Limiting circuit 17 is employed to further reduce the range of amplitude variation of the $2f_c$ waveform and also provides a relatively square wave input signal to dividing circuit 18 which may be a binary trigger which scales the $2f_c$ waveform down to an $f_c$ waveform.

The receiver circuitry described above provides a carrier term having the correct frequency and phase for synchronous demodulation in the event of frequency translation in the transmission medium.

The use of other circuitry is possible within the scope of the invention. For example, the characteristics desired of symmetrizer circuit 12 could be roughly approximated by a tuned circuit. Also, the function of the narrow band filter 15 of FIG. 2 could be accomplished using a phase locked oscillator.

It is to be understood that the present invention is not restricted to use with the bipolar binary NRZ code illustrated in the various waveforms, and that this type coding was shown for convenience in the discussion. Multilevel coding can be employed.

What has been described is a novel system whereby the presence of a pair of frequency components for carrier retrieval are insured in the transmitted signal by transmitter circuitry. The system further includes receiver circuitry which retrieves the carrier term from the transmitted signal.

While the invention has been particularly shown and described with reference to preferred embodiments thereof, it will be understood by those skilled in the art that various changes in form and details may be made therein without departing from the spirit and scope of the invention.

What is claimed is:

1. In a transmission system, a transmitter for transmitting a suppressed carrier vestigial sideband modulation signal comprising in combination:

a source of binary data signal, a source of carrier signal, modulating means responsive to said binary data signal and said carrier signal for modulating said carrier signal with said data signal, a vestigial sideband filter coupled to the output of said modulating means for filtering the output signal therefrom, and means coupled between said source of binary data signal and said modulating means for modifying said data signal with a continuous signal having a predetermined amplitude for providing at least one component frequency in said transmitted signal approximately at the frequency of said carrier signal and lying within a range of frequencies effectively passed by said vestigial sideband filter, said predetermined amplitude of said continuous signal being derived from the maximum pattern length of said binary data signal having data patterns with at least one frequency component greater than the greatest frequency effectively passed by said vestigial sideband filter.

2. A transmission system according to claim 1 wherein said means for modifying said data signal with a continuous signal provides a single frequency component in said transmitted signal at the frequency of said carrier signal.

3. A transmission system according to claim 1 wherein said continuous signal from said modifying means is a direct current signal having a predetermined amplitude derived from the ratio of the data rate of the binary data signal to the bandwidth equivalent of carrier recovery bandwidth.

4. A transmission system according to claim 1 wherein said means for modifying said data signals with a continuous signal is a battery and a resistor coupled in series and connected between said source of data signals and said modulating means.

5. A transmission system according to claim 1 wherein said binary data signal has a maximum data rate of $f_d$, wherein said vestigial sideband filter provides a baseband equivalent of carrier recovery bandwidth of $f_1$, and wherein said predetermined amplitude of said continuous signal is derived from data patterns having pattern lengths less than the ratio $fd/f_1$.

References Cited by the Examiner

UNITED STATES PATENTS

| | | | |
|---|---|---|---|
| 2,797,314 | 6/1957 | Eglin | 325—331 |
| 2,828,414 | 3/1958 | Rieke | 325—331 |
| 2,871,295 | 1/1959 | Stachiewicz | 325—49 |
| 2,979,566 | 4/1961 | Hopner et al. | 178—67 |
| 3,001,140 | 9/1961 | Beck | 178—66 |
| 3,062,913 | 11/1962 | Myrick | 178—66 |
| 3,088,071 | 4/1963 | Matsushima | 325—50 |
| 3,152,305 | 10/1964 | Becker et al. | 325—50 |

DAVID G. REDINBAUGH, *Primary Examiner.*

STEPHEN W. CAPELLI, *Examiner.*